United States Patent Office 2,788,682
Patented Apr. 16, 1957

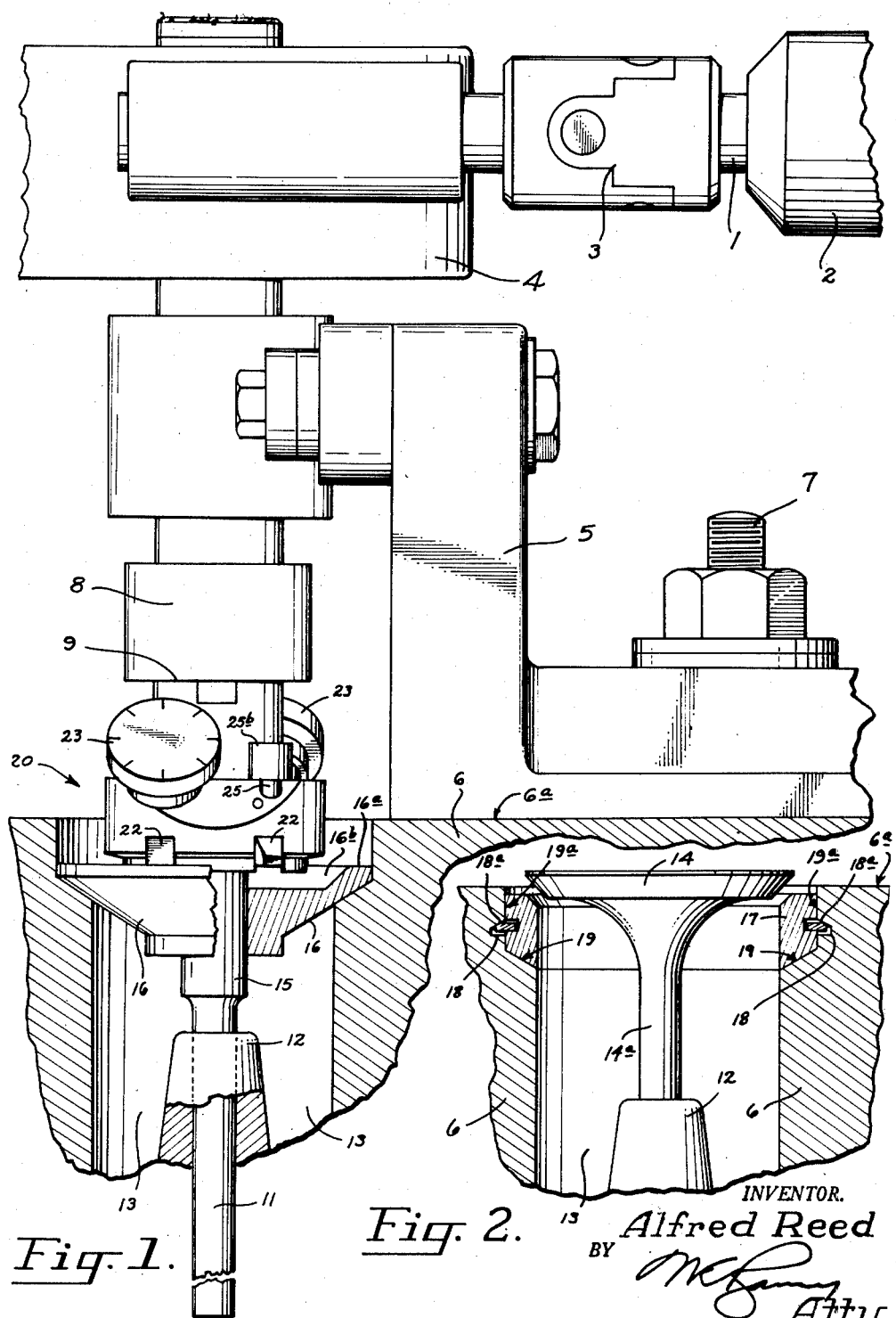

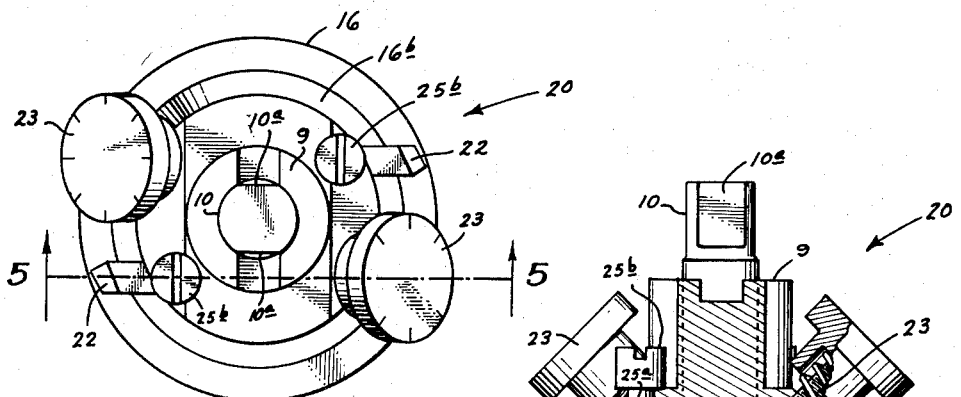
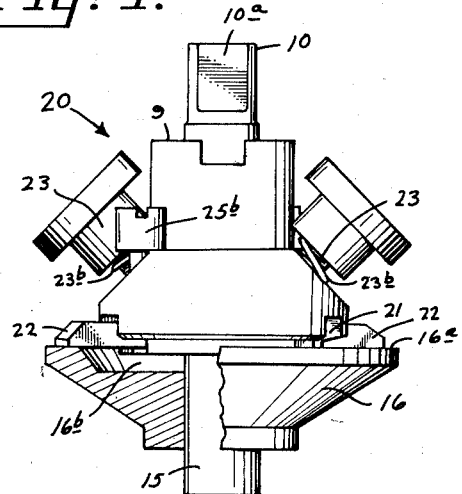
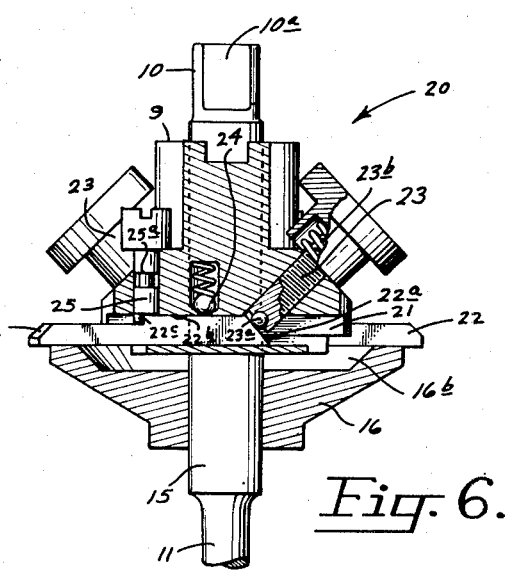

2,788,682
GROOVE CUTTING TOOL
Alfred Reed, Portland, Oreg.
Application February 15, 1954, Serial No. 410,213
8 Claims. (Cl. 77—2)

The principal object of my invention is to provide a cutting tool for forming a lateral annular recess in the bore of a cup-shaped recess for a valve insert. This is to serve as a locking means for holding the valve insert in place about the port of an internal combustion engine. My invention is directed to the provision of a tool making possible economically the practice of the invention which is described in my copending application for patent entitled "Removable Valve Seat for Internal Combustion Engines," Serial No. 397,931, filed December 14, 1953.

A general discussion of the problem involved is set out in my copending application for patent and reference is had thereto. One of the serious practical difficulties in seating valve inserts about the port of an engine is that they must be held against any movement axially of the port, but yet they must be permitted to elongate radially without setting up differential rupturing strains due to heat changes. Said inserts and the blocks are commonly made of different materials which have differential coefficients of expansion. If the valve insert is seated tightly in a recess and the valve insert is made of an alloy steel, its coefficient of expansion being greater, it will set up rupturing strains in a cast iron or cast steel engine block or head. Thus, the insert must be held solidly against movement longitudinally of the port and the seat surrounding it, but yet must accommodate radial expansion. I have solved this by providing such inserts with radially expansible locking rings. Said locking rings lie partly within a peripheral groove in the valve insert and partly in a lateral groove extending about the bore of the recess formed for receiving said valve insert. The groove in the recess is provided with a sloping side portion so that when the locking ring tends to expand as it does normally under operating conditions, it will ride along said sloping side and continue to hold the insert tightly in its recess. Because the tolerances must be held within several thousandths of an inch, a precise location of said groove in the recess is difficult to measure and is more difficult to cut. The critical dimension is the dimension from the floor of the recess to the sloping ceiling of the groove in the bore of the recess.

I have devised a cutting tool which readily adapts itself to tools now used by the automotive industry and one which will form said grooves easily and accurately within the tolerances allowed. Said cutting tool involves a bearing member which conforms generally to the shape of the insert which is to fit into the recess, or at least that portion of the insert lying between the floor of the recess and the groove for the retaining ring. This bearing thus serves as a gauge to locate and guide the cutting tools which may be radially extended to cut said grooves within the bore of the recess, without the need of any calculation or measurement.

Further details of my invention are hereinafter described with reference to the accompanying drawings, in which:

Fig. 1 is an elevation of a valve seat replacement tool of more or less standard construction, shown mounted upon a fragmentary portion of an engine block and engaging a tool embodying my invention, portions of said tool being shown broken away and in part foreshortened to disclose a sectional detail;

Fig. 2 is a sectional view of that portion of an engine block in which a valve and valve seat insert is arranged, with said valve seat insert secured in place by radially expanding locking ring;

Fig. 3 is a longitudinal elevation of a cutting tool embodying my invention, with a portion of the collar shown in section;

Fig. 4 is a plan view thereof;

Fig. 5 is a sectional view taken on the line 5—5 in Fig. 4, with the cutting tools shown retracted; and Fig. 6 is a similar view, shown with the cutting tools extended and in cutting position.

A cutting tool embodying my invention is shown in Fig. 1 as adapted for use with a valve seat replacement tool of more or less standard construction. Such a tool is one sold under the trademark "Kwik-Way Valve Seat Replacement Tool," manufactured by The Cedar Rapids Engineering Co., of Cedar Rapids, Iowa. My invention is not limited to use with a valve seat replacement tool of this specific manufacture, but it is shown adapted to this tool because it is more or less standard in the industry.

In any event, a valve seat replacement tool comprises a drive shaft 1, usually engaged by a chuck 2, which includes in the power train a universal joint 3, a driving unit 4, and a base and swivel casting 5. The base portion is held to an engine block 6 by a hold-down bolt 7. A driven shaft 8 is journaled in the driving unit and has a noncircular clutch face 9 formed thereon. The foregoing is a general description of a machine tool for which my cutting tool is specifically devised.

A cutting tool embodying my invention comprises an elongated pilot shaft 10, shown most clearly in Figs. 3, 5 and 6. The lower end 11 is cylindrical, although having a slight taper, and constitutes a terminal pilot member with a boss 12 commonly provided within a valve port 13 to engage the stem 14a of a poppet-type valve 14, as is illustrated in Fig. 2. Said lower end has the same general diameter as that of the valve stem, and thus when the valve is lifted out, the end 11 will slidably engage said boss and center the pilot shaft in the port, as is illustrated in Fig. 1. An intermediate portion 15 of said pilot shaft is concentric with the terminal pilot member carried by the lower end 11 and defines a centering pilot member. A bearing member 16 is journaled thereon. Said bearing member has a peripheral outline substantially the same as that of the lower half of a valve insert 17 of the type illustrated in Fig. 2. That is, it resembles that portion of the valve insert lying below the floor of the groove 18 cut into the engine block 6 and surrounding the exposed end of the valve port 13. Said recess is counterbored into said engine block and preferably has a sloping floor 19. Its side walls 19a are parallel so as to produce a recess of more or less constant diameter from the upper face 6a of the engine block to the margins of the sloping floor 19.

The groove 18 has a sloping ceiling 18a and such profile is to be cut by a cutting tool embodying my invention. It is essential that said recess be located exactly with respect to the sloping floor, so that the valve insert 17 will seat tightly in the recess and will not come loose and hammer in the recess. Thus, by making the peripheral outline of the bearing member 16 correspond to that portion of the valve insert, I am assured that the upper face 16a lies exactly on the plane of the floor of the groove 18 to be cut. The cutter head assembly 20 is journaled upon the pilot shaft 10 and bears upon the cup-shaped upper face 16a of the bearing member 16. That is to say, the peripheral portion of the upper face 16a lies in a plane and the central portion 16b of said upper face is recessed to accommodate said cutter head assembly. Said cutter head is provided with a pair of cutter ways 21 on that face adjacent the bearing member. These ways are shown as parallel in Fig. 4 and each extends substantially tangential to the periphery of the intermediate portion 15 of the pilot shaft 10.

An elongated cutter bit 22 slides in each of said ways and their cutting ends are profiled to produce the recess to be formed, as shown in Fig. 2. The other or inner end 22a of each of the cutter bits is formed upon an oblique angle and is engaged by the end of a feed screw 23 having an antifriction bearing 23a journaled therein. Thus, as the feed screw is screwed down, the antifriction bearing therein tends to roll over the obliquely sloped inner face of the cutter bit and to push the cutter bit outwardly. Each feed screw is preferably provided with a helically wound spring 23b to take up slack and to tend to hold the feed screw in set position. A spring pressed detent 24 seats in a registering groove 22b when the detent is aligned therewith, which is when the cutter bit is fully retracted, as is shown in Fig. 5. Thus, when the feed screw is screwed down, first it forces the spring pressed detent out of its groove 22b, and then the continued feeding pressure exercised by the feed screw 23 forces the bit outwardly until it assumes a position such as is illustrated in Fig. 6. The feed screws are each provided with calibrations so that the degree to which they are rotated may be indicated. Either or both cutter bits may be used selectively to form the recesses. I have found that usually but one is necessary. I have found that when said cutter ways are arranged more or less tangential to the intermediate portion 15 of the pilot shaft 10, they will feed smoothly and without chattering to produce a smooth finished groove about the valve insert recess.

To constitute a depth gauge, I provide for each cutter bit a journaled pin 25 with an eccentric stop 25a formed thereon. This stop engages a shoulder 22c on each cutter bit. When said journaled pin is rotated 180 degrees, such as is illustrated in Figs. 5 and 6 of the drawings, it will permit the cutter bit to be shifted by a feed screw from the position shown in Fig. 5 to the position shown in Fig. 6. The pin is initially set so that its stop is directed toward the pilot shaft 10 when the cutter assembly is not being used. In this way, the cutter bits, and particularly the ends thereof, may not be damaged because they will lie within the peripheral outline of said bearing member 16. When they are to cut a groove, the milled heads 25b may be rotated 180 degrees so that the stop 25 will be spaced its maximum distance from said pilot shaft 10.

The feed screw then may be screwed down, and when the shoulder 22c thereon engages the stop 25a, it will indicate that a groove of proper depth will have been formed. Then said feed screw may be backed off to assume its original position and the cutter bit may be retracted by rotating the journaled pin 180 degrees, which will force the cutter bit back against its feed screw.

The upper end 10a of the pilot shaft may be flattened so that if the pilot shaft becomes stuck or wedged in the valve boss, it may be rotated by a wrench or other tool to loosen it to permit said pilot shaft to be retracted. It is thus seen that a cutter head embodying cutter bits may be guided and held in close position upon a pilot shaft by resting upon a bearing which is complementary to that portion of the valve insert recess lying below the groove to be formed for holding said valve insert in place. The tool comprises but three main parts, the pilot shaft, bearing member and cutter head assembly. The cutter head assembly rests upon the floor of the recess in which the groove is to be formed and is centered thereon and tends to hold the pilot shaft coaxially with the port. The cutter head assembly may thus rotate about the periphery of the intermediate portion of the pilot shaft, resting upon said bearing, and cut the groove accurately at a fixed and predetermined distance from the floor thereof without the need of visual inspection and without measurement. The cutting depth of the cutter bit is limited by depth gauges, and said depth gauges also tend to retract the cutter bits to permit the withdrawal of the cutter bit assembly.

I claim:

1. A cutting tool for forming a lateral annular groove in the bore of a cup-shaped valve insert recess, said tool comprising an elongated pilot shaft, one end of which is cylindrical and constitutes a terminal pilot member, and an intermediate portion concentric with said terminal pilot member defining a centering pilot member, a bearing member journaling the centering pilot member of said pilot shaft, said bearing member conforming to and being complementary to the floor and the adjacent portions of said valve insert recess, and a cutter assembly journaled upon said pilot shaft and at least partially supported upon said bearing member to define a cutter way, said cutter assembly having means for operatively engaging a power drive means.

2. A cutting tool for forming a lateral annular groove in the bore of a cup-shaped valve insert recess, said tool comprising an elongated pilot shaft, one end of which is cylindrical and constitutes a terminal pilot member, and an intermediate portion concentric with said terminal pilot member defining a centering pilot member, a bearing member journaling the centering pilot member of said pilot shaft, said bearing member conforming to and being complementary to the floor and the adjacent portions of said valve insert recess, a cutter assembly journaled upon said pilot shaft and defining a cutter way, said cutter assembly having means for operatively engaging a power drive means, and cutter means associated with said cutter way and having cutter feed means bearing thereon and extending obliquely upwardly from said way.

3. A cutting tool for forming a lateral annular groove in the bore of a cup-shaped valve insert recess, said tool comprising an elongated pilot shaft, one end of which is cylindrical and constitutes a terminal pilot member, and an intermediate portion concentric with said terminal pilot member defining a centering pilot member, a bearing member journaling the centering pilot member of said pilot shaft, said bearing member conforming to and being complementary to the floor and the adjacent portions of said valve insert recess, said bearing member having a cupped upper surface with a plane rim portion, a cutter assembly journaled upon said pilot shaft and defining a cutter way, said cutter assembly having means for operatively engaging a power drive means, cutter feed means associated with said cutter way, said cutter feed means extending obliquely upwardly from said way, adjustable stop and cutter retracting means extending upwardly from the said cutter way, said adjustable stop and cutter retracting means including an eccentric for engaging a cutter in said way, the plane of the floor of each way coinciding with the plane of the plane rim portion of the bearing member, whereby said plane rim portion defines a guiding and locating surface for said cutter assembly, as it rotates about said pilot shaft.

4. A cutting tool for forming a lateral annular groove in the bore of a cup-shaped valve insert recess, said tool comprising an elongated pilot shaft, one end of which is cylindrical and constitutes a terminal pilot member, and an intermediate portion concentric with said terminal pilot member defining a centering pilot member, a bearing member journaling the centering pilot member of said pilot shaft, said bearing member conforming to and being complementary to the floor and the adjacent portions of said valve insert recess, said bearing member having a cupped upper surface with a plane rim portion, a cutter assembly journaled upon said pilot shaft and defining a cutter way, said cutter assembly having means for operatively engaging a power drive means, cutter feed means associated with said cutter way, said cutter feed means extending obliquely upwardly from said way, adjustable stop and cutter retracting means extending upwardly from the said cutter way, said adjustable stop and cutter retracting means including an eccentric for engaging a cutter in said way, said stop and cutter retracting means lying at opposite sides of said pilot shaft, the plane of the floor of each way coinciding with the plane of the plane rim portion of the bearing member, whereby said plane rim portion defines a guiding and locating surface for said cutter assembly, as it rotates about said pilot shaft.

5. A cutting tool for forming a lateral annular groove in the bore of a cup-shaped valve insert recess, said tool comprising an elongated pilot shaft, one end of which is cylindrical and constitutes a terminal pilot member, and an intermediate portion concentric with said terminal pilot member defining a centering pilot member, a bearing member journaling the centering pilot member of said pilot shaft, said bearing member conforming to and being complementary to the floor and the adjacent portions of said valve insert recess, said bearing member having a cupped upper surface with a plane rim portion, a cutter assembly journaled upon said pilot shaft and defining a cutter way, said cutter assembly having means for operatively engaging a power drive means, cutter feed means associated with said cutter way, said cutter feed means extending obliquely upwardly from said way, adjustable stop and cutter retracting means extending upwardly from the said cutter way, said adjustable stop and cutter retracting means including an eccentric for engaging a cutter in said way, said stop and cutter retracting means lying at opposite sides of said pilot shaft, a detent entering said way and lying intermediate the feed means and stop and cutter retracting means for said cutter way, the plane of the floor of each way coinciding with the plane of the plane rim portion of the bearing member, whereby said plane rim portion defines a guiding and locating surface for said cutter assembly, as it rotates about said pilot shaft.

6. A cutting tool for forming a lateral annular groove in the bore of a valve insert recess, said groove to lie a predetermined distance above the floor of said recess, said tool comprising an elongated pilot shaft, one end of which is cylindrical and constitutes a terminal pilot member, and an intermediate portion concentric with said terminal pilot member defining a centering pilot member, a bearing member journaling the center pilot member of said pilot shaft, said bearing member conforming to and being complementary to the floor and the adjacent portions of said valve insert recess, said bearing member having a cupped upper surface with a plane rim portion, a cutter assembly journaled upon said pilot shaft and defining a cutter way, said cutter assembly having means for operatively engaging a power drive means, the plane of the floor of each way coinciding with the plane of the plane rim portion of the bearing member, whereby said plane rim portion defines a guiding and locating surface for said cutter assembly, as it rotates about said pilot shaft.

7. A cutting tool for forming a lateral annular groove in the bore of a valve insert recess, said groove to lie a predetermined distance above the floor of said recess, said tool comprising an elongated pilot shaft, one end of which is cylindrical and constitutes a terminal pilot member, and an intermediate portion concentric with said terminal pilot member defining a centering pilot member, a bearing member journaling the centering pilot member of said pilot shaft, said bearing member conforming to and being complementary to the floor and the adjacent portions of said valve insert recess, said bearing member having a cupped upper surface with a plane rim portion, a cutter assembly journaled upon said pilot shaft and defining a pair of cutter ways each extending substantially tangential to the centering pilot member, said cutter assembly having means for operatively engaging a power drive means, cutter feed means associated with each of said cutter ways, said cutter feed means extending obliquely upwardly from said ways, the plane of the floor of each way coinciding with the plane of the plane rim portion of the bearing member, whereby said plane rim portion defines a guiding and locating surface for said cutter assembly, as it rotates about said pilot shaft.

8. A cutting tool for forming a lateral annular groove in the bore of a cup-shaped valve insert recess, said tool comprising a circular bearing member axially journaling a central pilot shaft member, said bearing member resting upon and conforming to and being complementary to the floor and the adjacent portions of said valve insert recess, and a cutter assembly journaled upon said central pilot shaft and defining a pair of cutter ways each extending substantially tangential to said central pilot member, said cutter assembly having means for operatively engaging a power drive means.

References Cited in the file of this patent
UNITED STATES PATENTS

| | | |
|---|---|---|
| 1,599,266 | Albertson | Sept. 7, 1926 |
| 1,980,288 | Olson | Nov. 13, 1934 |
| 2,500,469 | Rekettye et al. | Mar. 14, 1950 |